C. W. WRIGHT.
SYSTEM AND EDUCATIONAL APPLIANCE FOR MILITARY SELF INSTRUCTION.
APPLICATION FILED MAY 13, 1918.
1,342,520.                                      Patented June 8, 1920.
Fig. 4.
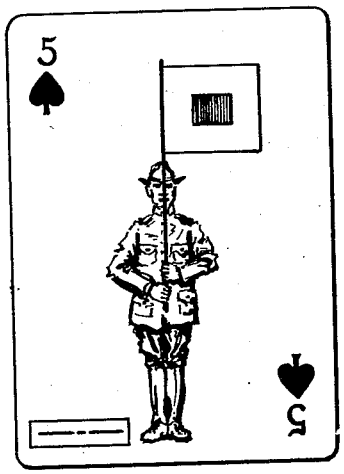
Fig. 1.
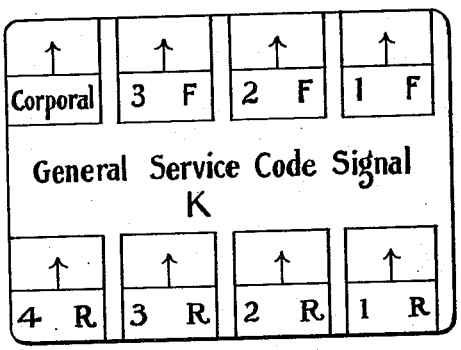
Fig. 5.
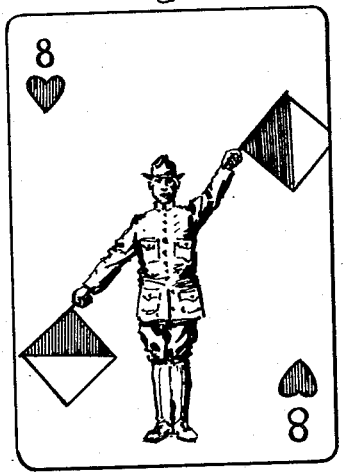
Fig. 2.
Fig. 3.
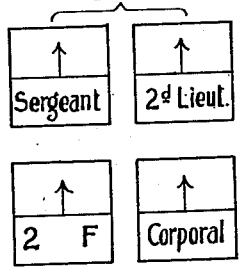
Inventor
Carr W. Wright
by Walter A. Knight
Attorney

UNITED STATES PATENT OFFICE.

CARR W. WRIGHT, OF CINCINNATI, OHIO.

SYSTEM AND EDUCATIONAL APPLIANCE FOR MILITARY SELF-INSTRUCTION.

1,342,520.

Specification of Letters Patent.

Patented June 8, 1920.

Application filed May 13, 1918. Serial No. 234,151.

*To all whom it may concern:*

Be it known that I, CARR W. WRIGHT, a citizen of the United States, residing at Cincinnati, in the county of Hamilton and State of Ohio, have invented new and useful Improvements in Systems and Educational Appliances for Military Self-Instruction, of which the following is a specification.

My invention is in the nature of a system of self-instruction, relating to the military art, carried out by means of suitably marked cards of an illustrative character constituting a deck or pack, which provides the raw recruit and the student of Infantry Drill Regulations with a convenient means of visualizing and thus more easily comprehending and fixing in memory, the various movements and formations prescribed therein; all as more particularly set forth herein.

Preferably the deck or pack numbering 53 cards may present on one face of each the features herein indicated relating to the drill formations and movements; and on the other face the conventional figures and indications of ordinary "playing cards," or others suitable for mere pastime, or educational interest.

The preferred character of the cards and their markings, used in carrying out my invention, are illustrated by individual samples shown in the accompanying drawings in which—

Figure 1 represents the face of one of a group of the cards showing a diagram of a squad of infantry assembled in close order formation.

Fig. 2 represents the face of one of a group of the cards containing problems in military drill and shows the arrangement of such problems.

Fig. 3 represents, grouped together, four of the movable units indicating "private," "corporal," "sergeant," "lieutenant."

Figs. 4 and 5 represent the opposite faces of the cards indicated in Figs. 1 and 2.

The system of self instruction herein described is designed to provide the student of military drill regulations with a means of interpreting the various movements and formations prescribed and described in the official Infantry Drill Regulations of the United States Army; and of learning such formations and movements in a thorough manner so as to render the student more efficient on the drill field. With this are combined certain game or other features in the nature of pastime interest as described.

Each of 14 of the cards of the pack shows on the back a diagram representing a squad of infantry of dimensions proportionate to those of a squad of infantry in actual service assembled in close order formation, (Fig. 1). Each man of the squad is represented in the diagram by a small rectangle bisected laterally by a line corresponding with the line of a man's shoulders. This lateral line is in turn bisected by an arrow the base of which rests on the center of the lateral or shoulder line. This arrow indicates the direction of the head, eyes and march. The position of each man in the squad is shown in the lower half of the rectangle in the following manner: Corporal is marked "Corporal;" No. 3 private of the front rank ("front" indicated by letter F) is marked 3F; No. 2 private of the front rank is marked 2F; No. 1 private of the front rank is marked 1F. The men in the rear ("rear" indicated by letter R) are thus marked from left to right 4R; 3R; 2R; and 1R respectively. Each of 39 of the cards (Fig. 2) contains on the back certain problems in military drill corresponding with a paragraph or paragraphs of the official Infantry Drill Regulations of the United States Army (indicated by the letters U. S.: I. D. R.) and also references to the paragraph or paragraphs of such regulations describing and prescribing the movement or formations necessary for the solution of such problem or problems. These problems are divided into three groups marked "A," "B" and "C" respectively. Those of group "A" are numbered in the upper right hand corner from 1 to 39 inclusive.

In addition to the "deck" or "pack" of cards described, I provide a set of small rectangular, independent units of card-board or other material (Fig. 3) corresponding in size and markings with the units shown on the backs of the 14 cards before mentioned. These may be moved to any intermediate and final position in carrying out the prescribed movements of the squad; by way of detailed illustration. There are sufficient of these to constitute two squads with the complement of corporals, and other non-commissioned and commissioned officers of a company of infantry, which may be colored to distinguish suitably.

On their backs, severally, the 52 cards, constituting the "pack" proper may contain the indications usual upon ordinary "playing" cards of the figures and symbols indicating their character or relative "value" or indications relative to any other game played with cards; or printed or pictorial indications suitable for instruction or pastime. The fifty-third card may be designated in any suitable manner as the "joker."

In studying the Infantry Drill Regulations of the United States the student can use the squad of company cards, representing squads assembled, the two groups of independent units, and those representing the non-commissioned and commissioned officers of the company in the following manner:

First, in order to interpret the Infantry Drill Regulations, he can arrange the company or a portion of it in the formation described at the beginning of a paragraph of such Infantry Drill Regulations, and then by moving the squads, (Fig. 1) or rectangles, (Fig. 3) representing men either individually or collectively, illustrate to himself the text of the paragraph that he is endeavoring to understand. By this process he can see precisely how each man moves in executing the movement or formations and also why he must so move, and thus will more easily understand what he is reading. At the same time, in thus seeing how the movement is executed and why it is so executed, a permanent impression will be made on his mind. and his efficiency in actual drill will be proportionately increased. He will incidentally familiarize himself with the duties and movements of every other man in the company; whereas, in actual drill it would be extremely difficult to learn the duties of other positions unless his superiors saw fit to change his position frequently.

Second, he can use one of the squads of independent unit rectangles and further improve his knowledge of the School of the Squad very effectively with the aid of the printed and illustrated cards. He arranges the cards in their numerical order in accordance with the numbers in the upper right hand corners of paragraphs "A" and then begins with paragraph "A" of card No. 1. He arranges his men in the formation called for at the beginning of that paragraph and then recalls what commands would be necessary and how they would be carried out in order to effect the movement called for. After completion he turns to the paragraph of the Infantry Drill Regulations to which the card refers and ascertains whether or not he executed the movement correctly. If he did not, or if his command were incorrect, the fact that he made a mistake coupled with his ability to locate that mistake, will permanently fix the correct procedure in his mind and prevent the occurrence or recurrence of the same mistake in actual drill. Having completed the first movement or formation he takes the next card from the pack and proceeds similarly as called for in paragraph "A" of that card. He continues in this way until he has gone through all the cards pertaining to the School of the Squad and he then takes up the cards pertaining to the School of the Company and uses them in the same way. Paragraphs "A," in the numerical order of the cards will in this way take him through a complete drill in all the close and extended order movements of the School of the Squad and the School of the Company in a logical sequence as could occur on the drill field.

Third, to develop an ability to think quickly the soldier will take all of the cards containing printed matter and arrange them in groups in accordance with the first lines of paragraphs "B," i. e., he will place all the cards, paragraphs "B" of which are headed "Being in line" in one group, "Being in column of squads" in another and so on. He then shuffles each group, after which he takes a card from the top of the pile "Being in line" and begins to work. He recalls what commands are necessary to cause the execution of the movement called for and then carries them out. Having done so he turns to the paragraphs of the I. D. R. to which the card refers and sees whether or not he did it correctly. If, after the movement is completed,—for example, the company being in column of squads,—he takes a card from the group headed "Column of squads" and continues the movement. This process can be kept up indefinitely, the cards artificially creating the contingencies as they would arise on the drill field. In this way he will acquire an ability to think quickly in prescribed military terms under any circumstances that may arise on the drill field. The cards will bring out the points of uncertainty which the student may not have thought existed, thereby enabling him to strengthen his points of weakness off the drill field and thereby save himself and his officers a great deal of annoyance and embarrassment.

Fourth, in order to further improve his power of visualization, the student may use the paragraphs "C." These paragraphs contain commands in the prescribed phraseology and in "running through" the pack the student can visualize the movements and formations called for, slowly at first but later with gradually increased speed as the cards are dealt more rapidly from the pack. In this way he will develop an ability to foresee movements instantly and know exactly what these results will be, before they are carried out.

Fifth, each day after drill he can use his card-board company to rehearse movements in which he or others erred, with or without the assistance of a non-commissioned or other officer.

Sixth, a corporal or other non-commissioned officer can take a group of men and assign one man to each squad or platoon, give the prescribed commands and have the men execute them with the card-board units or cards. In this way the non-commissioned officer can correct points of uncertainty among his men, assist them to acquire the ability to lead squads, act as platoon guides or leaders and thus increase the efficiency of his men as well as his own.

Seventh, by disregarding everything on the cards except the playing card indications, any game can be played that is played with the ordinary pack of 53 playing cards.

I claim as my invention and desire to secure by Letters Patent of the United States:—

1. A set of cards comprising small units each suitably marked to represent a soldier or officer with his front or rear rank position and the direction he is facing indicated thereon; with other cards representing in like manner groups of enlisted men below the rank of sergeant, in squad formation; said cards together adapted to be arranged in such contiguity as to correctly represent diagrammatically formations or movements of infantry organization.

2. A set or "pack" of playing cards comprising a series having upon their faces diagrammatic representations of squad of infantry soldiers with units in position, and cards having upon their faces varied problems of evolutionary movements and formations as prescribed by the U. S. Drill Regulations to be worked out by appropriate use of the series cards.

3. The educational appliance consisting of a pack of cards containing statements of problems pertaining to evolutions such as would take place on a drill field in the ordinary drill practice, coupled with visual representations adapting them to use as a substitute for the exigencies of such drill; so that by the process of shuffling the cards the sequence of movements can be varied and the student thus aided to develop an ability to memorize the necessary movements and comprehend the character and proper sequence of evolution by visualizing the same by use of the cards.

4. A set or pack of playing cards comprising a series having on their faces diagrammatic representations of a squad formation of soldiers, and cards having on their faces varied problems of military evolution and commands appropriate thereto to be worked out by appropriate use of the series cards.

5. A set or pack of playing cards comprising a series having on their faces a diagrammatic representation of a squad formation of soldiers and cards having on their faces statements in problematic form of military evolutions and appropriate commands relating thereto, all cards being provided on their backs with representative conventional symbols or pictorial illustrations for educational or pastime use.

6. In combination with a set or pack of playing cards of the character indicated, containing diagrammatic representations of squad formation, a plurality of card units representing severally a diagrammatic unit of company officers and movable in relative juxtaposition to the principal cards herein described.

In testimony whereof I have hereunto set my hand in presence of two subscribing witnesses.

CARR W. WRIGHT.

Witnesses:
LEWIS M. HOSEA,
S. A. ROETTINGER.